(12) United States Patent  
Mower

(10) Patent No.: US 7,383,926 B2  
(45) Date of Patent: Jun. 10, 2008

(54) ARC BRAKE

(75) Inventor: Michael L. Mower, Pine City, NY (US)

(73) Assignee: Sepac, Inc., Elmira, NY (US)

( * ) Notice: Subject to any disclaimer, the term of this patent is extended or adjusted under 35 U.S.C. 154(b) by 0 days.

(21) Appl. No.: 11/728,139

(22) Filed: Mar. 23, 2007

(65) Prior Publication Data  
US 2007/0170776 A1 Jul. 26, 2007

(51) Int. Cl.  
F16D 55/36 (2006.01)

(52) U.S. Cl. .................. 188/71.5; 188/17; 188/26; 188/218 XL

(58) Field of Classification Search .................. 188/17, 188/26, 71.5, 218 XL, 171, 271, 71.4; 192/12 R  
See application file for complete search history.

(56) References Cited

U.S. PATENT DOCUMENTS 6,913,123 B2 * 7/2005 Severinsson ................ 188/156

FOREIGN PATENT DOCUMENTS

DE 3425258 A1 * 3/1985

* cited by examiner

Primary Examiner—Xuan Lan Nguyen  
(74) Attorney, Agent, or Firm—Frank J. Benasutti

(57) ABSTRACT

A disc brake which is particularly designed for arcuate travel of less than 360 degrees has sector shaped segments, i.e. segments which are not complete circles and which are interleaved into a disc pack of multiple layers, wherein some layers of the disc pack each consist of a single disc segment which is less than a complete circle. Some segments are rotatable about an axis and others are stationary and have friction brake material carried on them at a position remote from the axis of rotation.

3 Claims, 5 Drawing Sheets

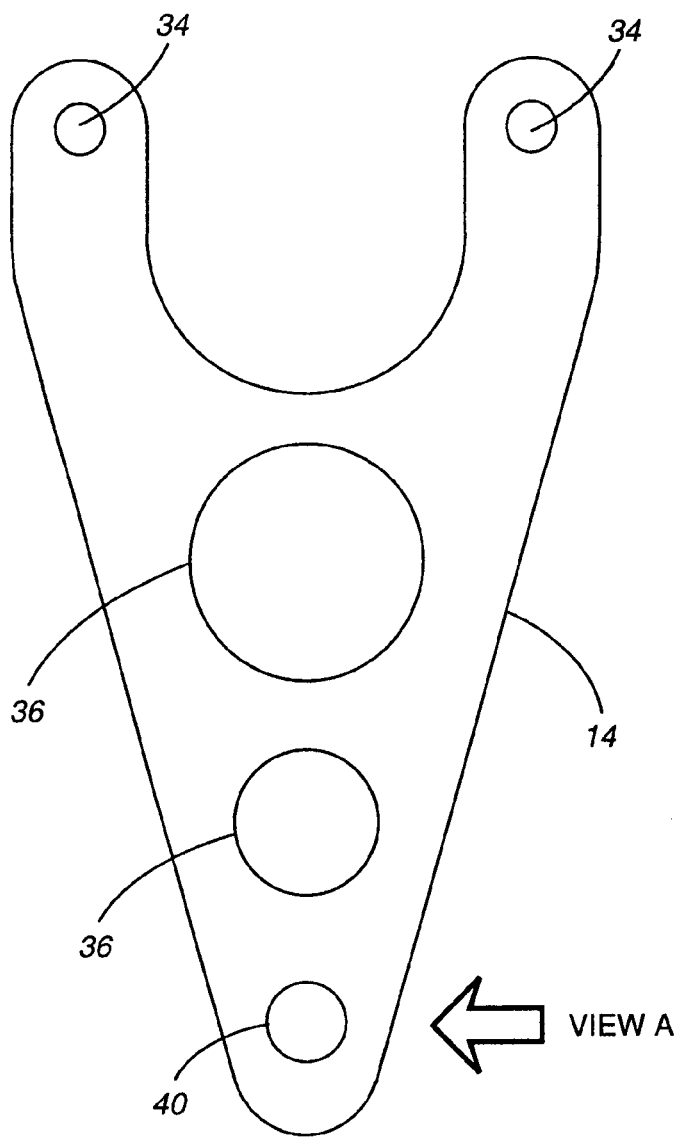
FIG. 5
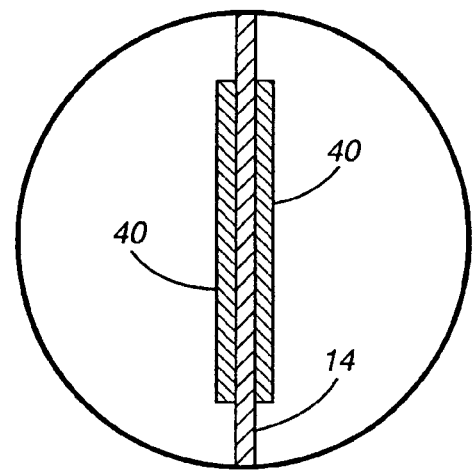
FIG. 6 VIEW A

ARC BRAKE

CROSS REFERENCE TO RELATED APPLICATIONS

This application claims the benefit of the filing date of my prior co-pending application Ser. No. 10/860,445 filed Jun. 3, 2004, the disclosure of which is incorporated herein by reference as if fully set forth.

BACKGROUND OF INVENTION

This invention relates to electromagnetically actuated mechanical brakes, and more particularly, to such brakes arranged in interleaved stacks.

In the prior art, electromagnetically actuated mechanical brakes having multiple discs are known. These may be operated as follows: normally the discs are forced together by a spring. When current is applied, an armature is attracted toward a magnetic body, thereby compressing the spring and releasing the discs; thus allowing them to be rotated. When current is discontinued to the coil, the spring pushes the armature into engagement with the discs, forcing them together to stop the movement of the load. Thus the device holds the load with the power off.

The discs are complete circles and are generally acted upon by a centrally disposed spring and armature. This configuration is both bulky and heavy. For example, a 360 degree brake to produce 90 foot pounds of torque would have a diameter of approximately 7 inches and weigh approximately 30 pounds.

It is desirable to make such breaks lighter and more compact; so that they can fit into small mechanical devices.

SUMMARY OF INVENTION

I have invented a new and improved disc brake which is particularly designed for arcuate travel of less than 360 degrees. In such devices, I use segments of discs which segments are not complete circles. I interleave these disc segments. Some segments are rotatable about an axis and have friction brake material carried on them at a position remote from the axis of rotation.

I have also invented such a brake wherein some segments have holes there through to make them lighter. Also, I provide friction material on some segments which material is circular in plan view.

BRIEF DESCRIPTION OF THE DRAWINGS

FIG. 5 is a plan view of an outer disc segment assembly shown in the prior figures; and FIG. 6 is an enlarged cross section of a portion of the outer disc assembly shown in FIG. 5.

DESCRIPTION OF THE PREFERRED EMBODIMENTS

Figure 1:
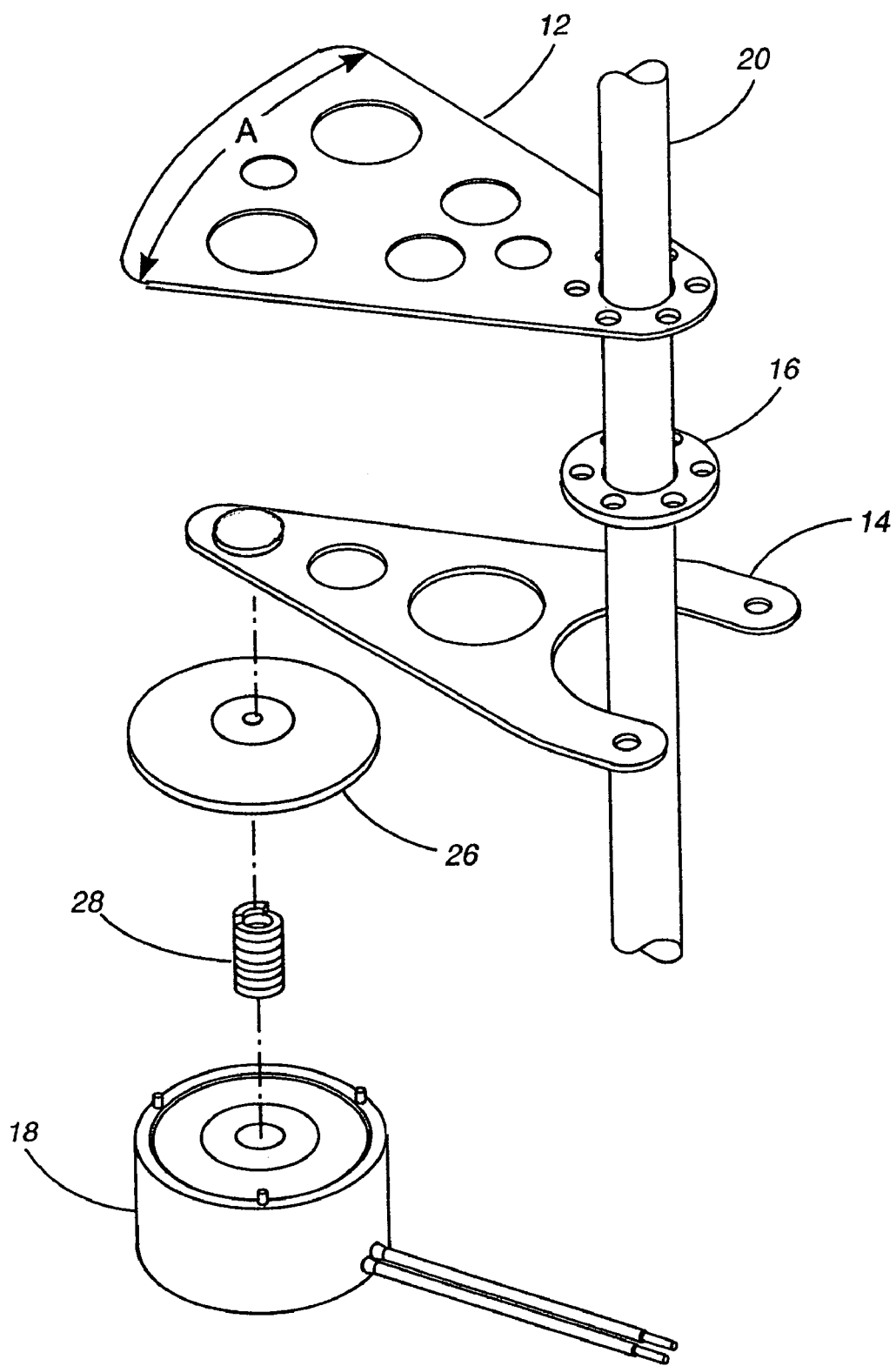
FIG. 1 is an exploded perspective view of parts of one embodiment of my invention.
Figure 2:
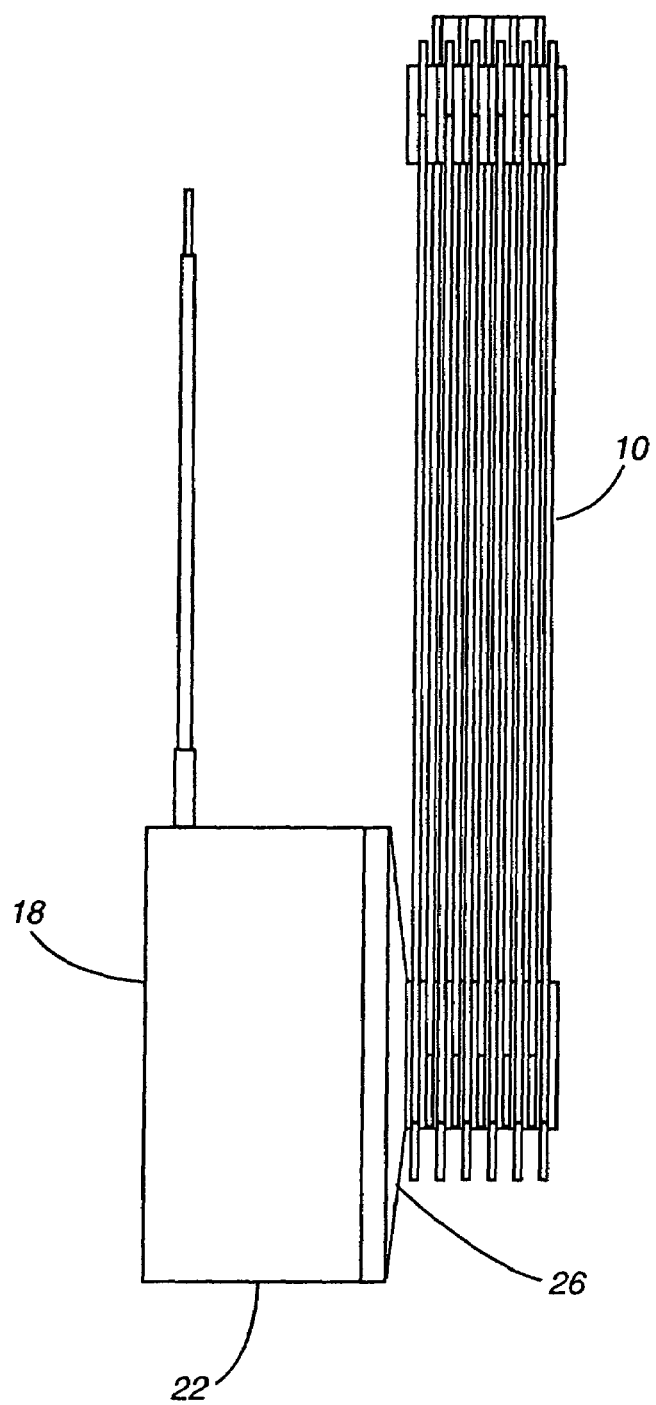
FIG. 2 is a side elevation of the parts shown in FIG. 1, reoriented to the vertical and assembled with additional parts.

Referring to the figures, FIG. 1 shows a plurality of pie shaped segments of discs. A plurality of these are arranged in an interleaved disc pack designated generally 10, FIG. 2. The inner disc segments 12 are spaced from the outer disc segments 14 by spacers 16. All are arranged about a shaft 20. The inner disc segments 12 rotate with the shaft. The outer disc segments are stationary. In operation, the shaft is mounted in a working device (not shown in greater detail) for movement with a portion thereof.

Figure 3:
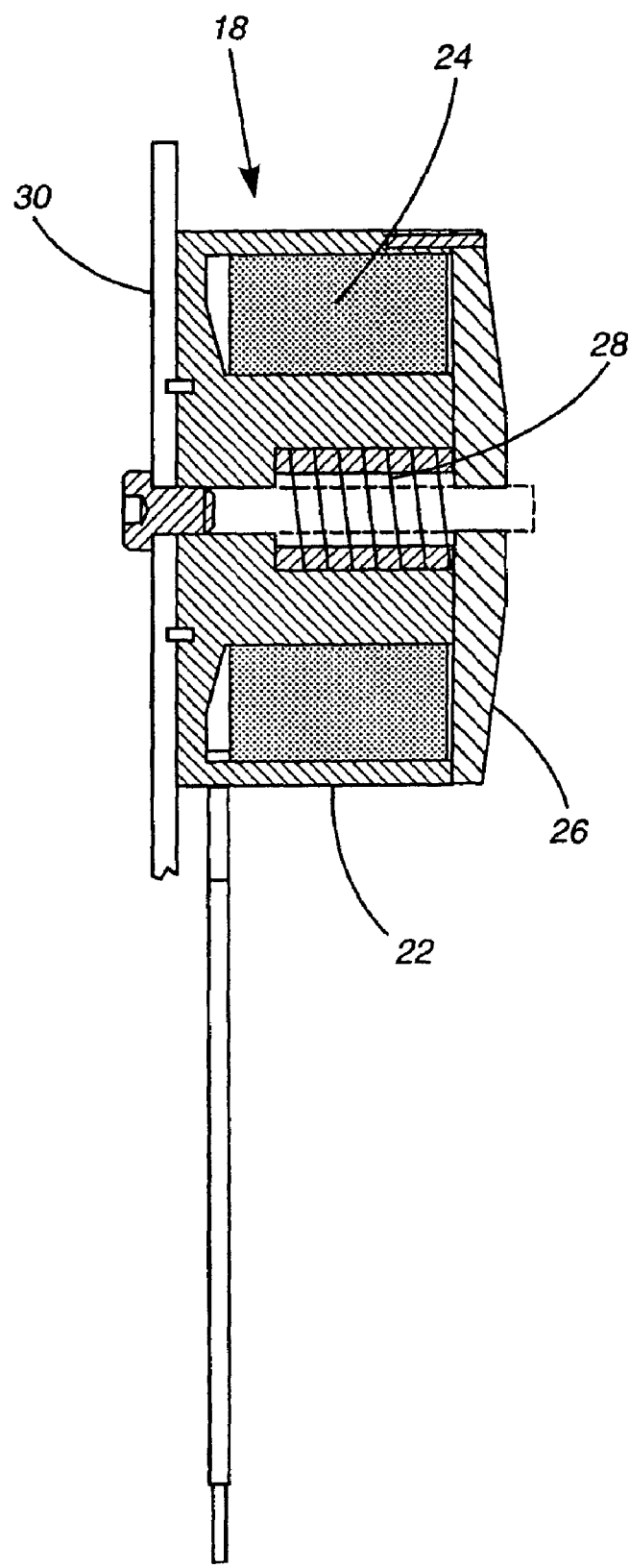
FIG. 3 is a section of an electromagnetically actuated armature and spring assembly of my device (as shown in FIG. 2), shown mounted to a frame.

A electromagnetically actuated armature and spring assembly is designated generally 18. The armature 26 engages the disk pack 10. This is shown in elevation in FIG. 2 and in section in FIG. 3. It comprises an outer body 22, a coil 24, an armature 26 and a spring 28. The outer body 22 is designed to be fixedly mounted to the frame 30 of the working device (referred to above).

Figure 4:
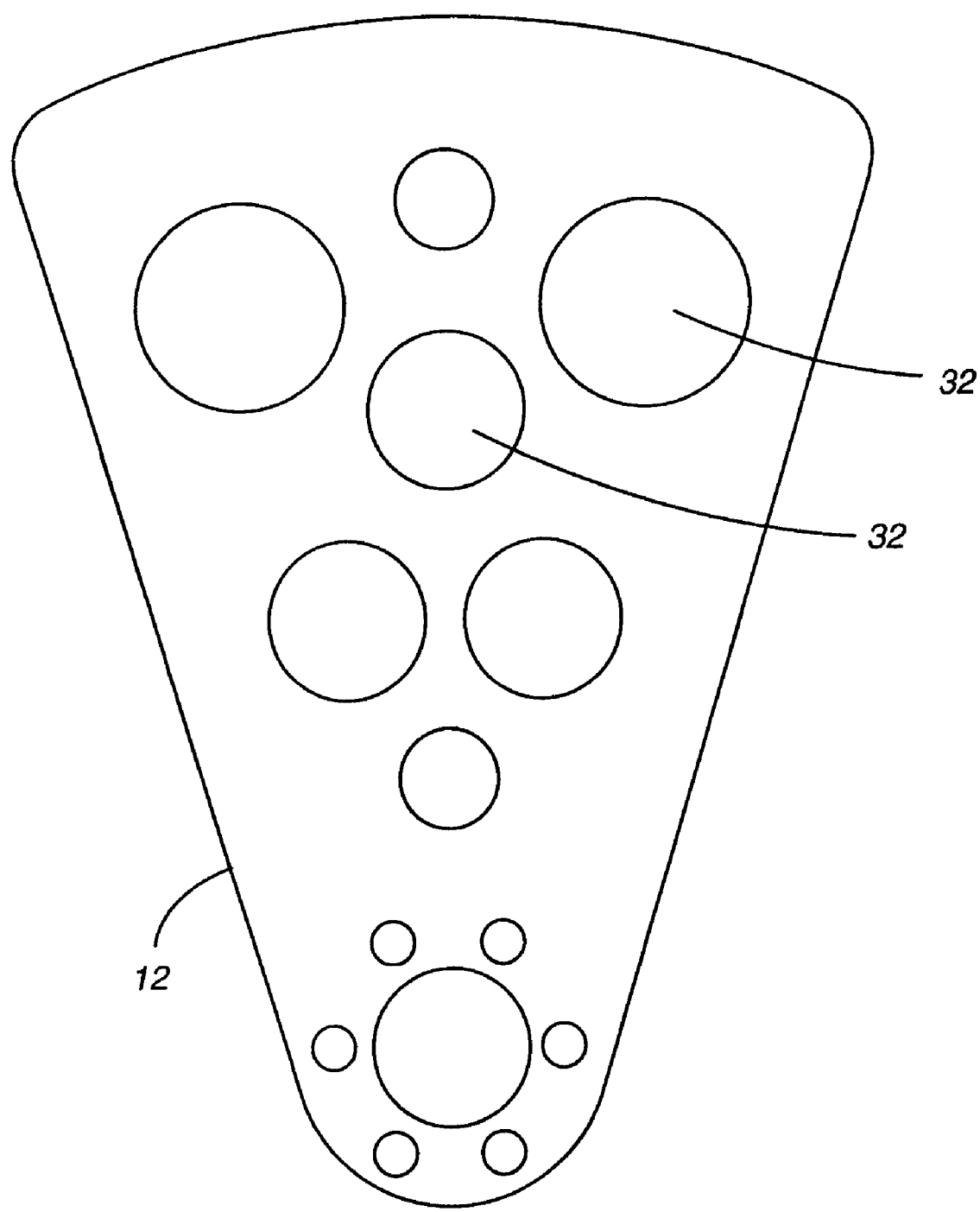
FIG. 4 is a plan view of an inner disc segment shown in the prior figures.

An inner disc segment 12 is shown in FIG. 4 and has a plurality of holes 32 there through to make it lighter in weight without sacrificing its strength. The material may be hard anodized aluminum to reduce wear.

The outer disc segment 14 is fixedly mounted on the working device as at 34. It has a plurality of holes 36 there through to make it lighter in weight without sacrificing its strength. The material may be clear anodized aluminum. The segment 14 carries a disc friction puck 40 on each side (see FIG. 6) positioned near the end remote from the shaft 20. These pucks are, most preferably, retained by adhesive on the surface of the disc segments; but may also be retained by any suitable means, such as, molding in place or riveting.

In operation, the spring 28 exerts a force against the armature 26 which engages and exerts a force upon the disc pack 10 to force the interleaved disc segments toward one another and engage the other friction pucks 40. This is the normal at-rest condition in which the brake is locked. When an electricity is applied to the electromagnet, the armature 26 retracts against the spring 28 and compresses it, thereby allowing the segments to move. This allows repositioning of the working device.

Breaking action is a function of the number of pucks, the coefficient of friction of the puck material, the spring force and the moment arm between the axis of rotation (at the shaft 20) and the radial position of the puck on the disc segment.

In one embodiment of my invention, the inner disc segments 12 can be rotated 15 degrees in each direction for a total travel of 30 degrees. The brake is stopped by mechanical stops in the working device which limit the travel of the brake. The surface area identified generally as "A" in FIG. 1, must be sufficient to engage the pucks a various positions throughout the expected range of travel of the discs. While 30 degrees is preferable for some devices, it will be understood that this invention may be applied to other ranges (more or less than 30 degrees) for working devices such as x-ray machines, CT scanners, MRI's, ultrasound apparatuses and the like. But for 30 degrees, in the example given above, my arc brake would be 5 inches (as opposed to 7 inches) and the weight would be 1.1 pounds (rather than 30 pounds) for 90 foot pounds of torque.

Although this design is for a normally off device, it will be understood that it can also be operated as a power on brake or a bi-stable pulse operated brake.

From what I have described I have invented an improvement in an electromagnet actuated brake comprising:

a plurality of discs interleaved into a disc pack of multiple layers, wherein some layers of the disc pack each consist of a single disc segment which is less than a complete circle;

some segments being rotatable about an axis of rotation;

and some disc segments having friction brake material carried thereon at a position remote from said axis.

I have further invented such a brake wherein some segments have holes there through to make them lighter and wherein some of the disc segments are sector shaped.

The invention claimed is:

1. In an electromagnet actuated brake, the improvement comprising:

a plurality of discs interleaved into a disc pack of multiple layers, wherein some layers of the disc pack each consist of a single disc segment which is less than a complete circle;

some segments being rotatable about an axis of rotation;

and some disc segments having friction brake material carried thereon at a position remote from said axis.

2. The brake of claim 1 wherein some segments have holes there through to make them lighter.

3. The brake of claim 1 wherein some of the disc segments are sector shaped.

* * * * *